2 Sheets—Sheet 1.
W. S. SMOOT.
MAGAZINE FIRE-ARMS.
No. 7,828. Reissued July 31, 1877.
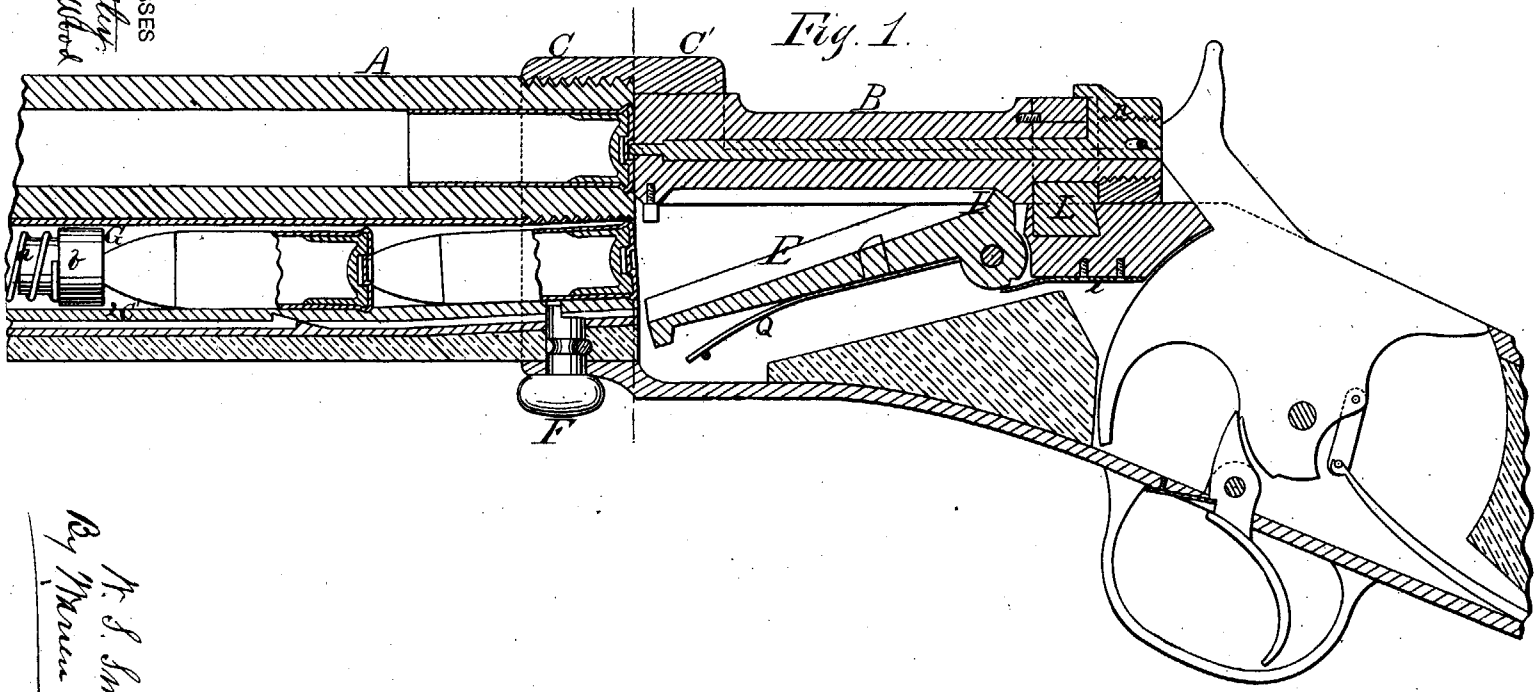
WITNESSES
M. P. Utley.
Arthur B. Wood
INVENTOR
W. S. Smoot
By Warren C. Stone
ATTORNEY
N. PETERS, PHOTO-LITHOGRAPHER, WASHINGTON, D. C.

2 Sheets—Sheet 2.
W. S. SMOOT.
MAGAZINE FIRE-ARMS.
No. 7,828. Reissued July 31, 1877.
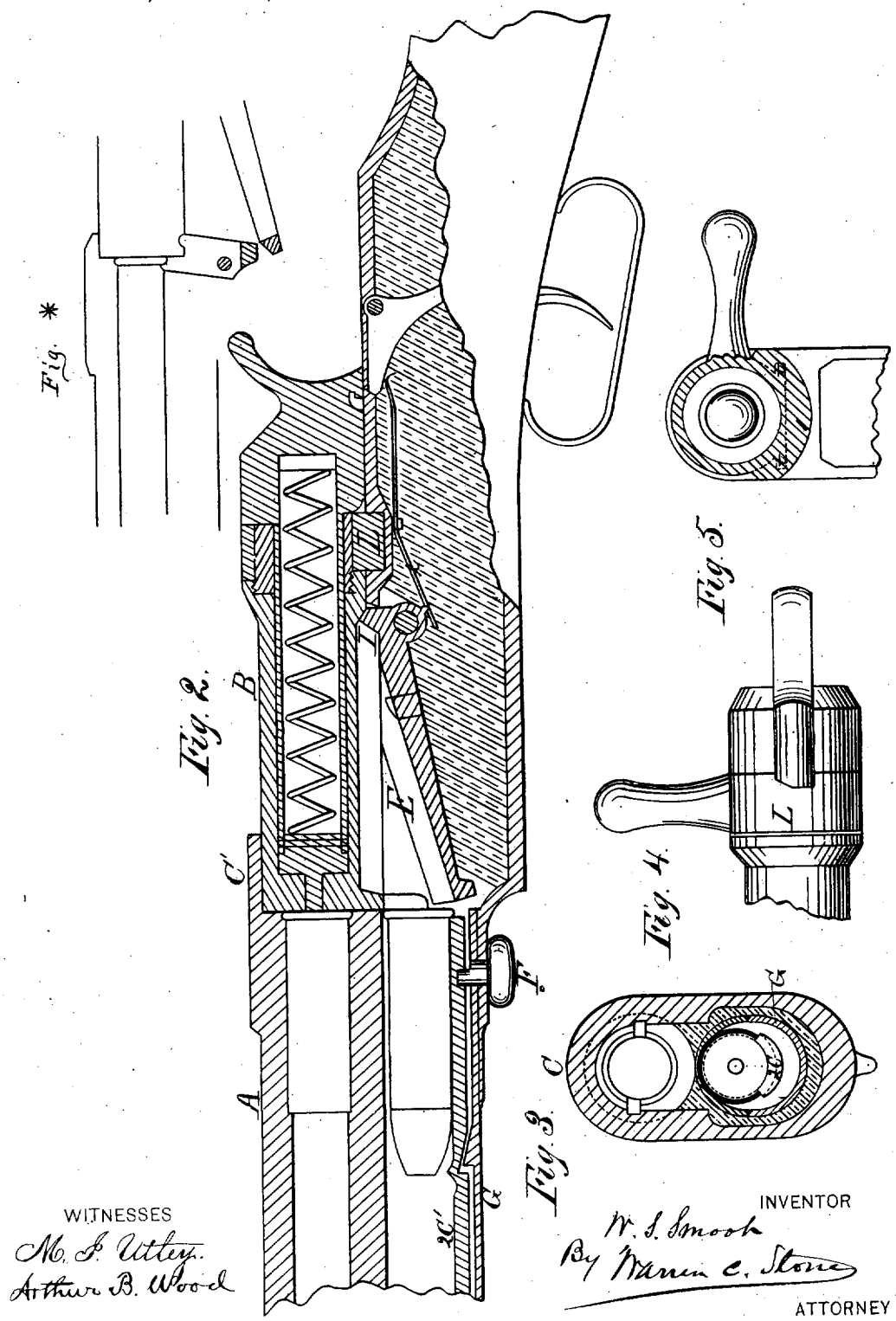
WITNESSES
M. F. Utley.
Arthur B. Wood
INVENTOR
W. S. Smoot
By Marion C. Stone
ATTORNEY
N. PETERS, PHOTO-LITHOGRAPHER, WASHINGTON, D. C.

UNITED STATES PATENT OFFICE.

WILLIAM S. SMOOT, OF ILION, NEW YORK.

IMPROVEMENT IN MAGAZINE FIRE-ARMS.

Specification forming part of Letters Patent No. 97,821, dated December 14, 1869; reissue No. 7,828, dated July 31, 1877; application filed January 26, 1877.

DIVISION B.

*To all whom it may concern:*

Be it known that I, WILLIAM SIDNEY SMOOT, of Ilion, Herkimer county, State of New York, formerly of Washington, District of Columbia, have made and invented certain new and useful Improvements in Repeating Fire-Arms, of which the following is a full and exact description, reference being had to the accompanying drawings, in which—

Figure 1 is a longitudinal section, showing the relative arrangement of the essential parts constituting my improved magazine-gun. Fig. 2 is also a longitudinal section, showing the same arrangement of breech and carrier, with a direct-acting hammer and spiral mainspring. Fig. 3 is a transverse section, showing the rear end of the barrel, magazine-tube, and clamping-slide. Fig. 4 is a plan of the breech-bolt, locking-key, and hammer. Fig. 5 is a transverse section, showing the locking-key in position in which the bolt is locked. Fig. * is a modification.

The barrel A may be of any convenient size or caliber, and screws into the receiver C. The breech-block slides back and forth on top of the receiver, and is held in place by ribs *t t*, which slide in grooves in the upper portion of the receiver, as shown in dotted lines, Fig. 5. The block B is supported against the recoil by an annular eccentric key, L, more particularly described in Division A, both in construction and operation.

The construction and arrangement, as well as operation, of the breech-block, firing-pin, hammer, mainspring, cartridge-retractor, and trigger, have been described in Division A.

The magazine-tube G is placed under the barrel, and may be covered by the stock. Its rear end is let into the receiver and inclined upward to facilitate the passage of the cartridges into the carrier. In the bottom of the magazine is a sliding rod, 2 C′, moved back and forth by the eccentric stud F, and having its under side formed into a series of ratchets corresponding in number and position with the oblique-faced studs on the lower inside of the magazine-tube. This sliding rod 2 C′ may have a notch or notches at intervals to catch the flange and more securely hold the cartridges in a fixed position, as shown in the drawing, although this is not necessary, as they will be sufficiently secure by the pressure or clamping action of the slide, as will be readily understood.

The receiver is so constructed as to leave a ledge or overhang, C′, projecting backward from the top over and behind the chamber of the barrel, so as to prevent the expulsion of the loaded cartridge when thrown up into line with the barrel by the upward motion of carrier.

The cartridges are fed to the rear onto the carrier E by a spiral spring, *a*. This spring is provided with a guiding-plunger, *b*.

In fabricating this magazine-tube, I prefer making it in halves, divided longitudinally, and with a slot between the two pieces, in which slot slides a stud on the plunger *b*, said stud and slot performing the function of guiding and limiting the movement of the plunger. In cross-section this tube is elliptical, with a vertical major axis, so as to allow space for the rod 2 C′, without unnecessarily increasing the bulk of the magazine.

The carrier E is pivoted to the sides of the receiver, above the center of the magazine, so that, when in its lower position, it shall form an incline, up which the cartridges may be forced by the spiral feeding-spring, and is capable of a limited vibration upon its pivot, so as to lift the cartridge into line with the barrel.

An arm, I, extends from the upper side of the carrier-block, and engages with the shoulder at the front end of the slot in the under side of the breech-block, when the latter is withdrawn, so as to obtain the necessary vibration of the carrier from the backward movement of the breech. A friction spring or stop, *l*, serves to hold the carrier in the position desired. A spring, Q, is attached to the under side of the carrier, and bears against a shoulder on the receiver to hold the carrier in such position relatively to the magazine that the passage of cartridges therefrom is prevented except when the carrier is forced down by the breech-block.

The cartridges which I use in this gun are formed with a depression in the base, at the bottom of which depression in the priming.

The bullets are truncated, so as to fit over the sides of this recess, and be thus prevented from resting against the priming.

It will be observed that, by means of the clamping device 2 C′, the cartridges in the magazine may be held in reserve while the arm is used as a single loader; and that the receiver is open at the top, so as to permit of the convenient charging of the barrel or magazine.

The manipulation and operation of this arm are obvious to those skilled in the art, and are fully described in Division A.

What I claim as my invention, and desire to secure by Letters Patent of the United States, is—

1. The combination, in a magazine fire-arm having a movable cartridge-carrier, of an overhang to keep the cartridges from being thrown from the receiver upon the upward movement of the carrier, as set forth.

2. The combination of a vibrating carrier, E, and overhang C′, the combination being and operating as set forth.

3. In a magazine-gun having an opening through the top of the receiver for the insertion of a cartridge, the overhang C′, as and for the purposes set forth.

4. An elliptical magazine or cartridge-receptacle for magazine-guns, as specified.

5. The combination, with the elliptical magazine, of the wedge-faced bar 2 C′, as set forth.

6. The wedge-faced bar 2 C′, operating in connection with a series of inclines on the bottom of the magazine to hold the cartridges firmly in place.

WILLIAM S. SMOOT.

Witnesses:
E. ROCHE,
H. H. BENEDICT.